United States Patent [19]

Lee

[11] Patent Number: 5,532,834
[45] Date of Patent: Jul. 2, 1996

[54] VIDEO CASSETTE RECORDER CAPABLE OF AUTOMATICALLY REMOVING INTERFERENCES BETWEEN A RECORDING SIGNAL AND A BROADCAST SIGNAL

[75] Inventor: Youn-Seong Lee, Seoul, Rep. of Korea

[73] Assignee: Daewoo Electronics Co. Ltd., Seoul, Rep. of Korea

[21] Appl. No.: 366,145

[22] Filed: Dec. 29, 1994

[30] Foreign Application Priority Data

Dec. 29, 1993 [KR] Rep. of Korea .................. 93-31092

[51] Int. Cl.$^6$ ........................... H04N 5/76; H04N 5/63
[52] U.S. Cl. .................. 358/335; 360/33.1; 348/730; 348/731
[58] Field of Search .................. 358/335, 340, 358/310; 360/33.1; 348/730, 731, 729; H04N 5/76, 5/63

[56] References Cited

U.S. PATENT DOCUMENTS 4,740,828  4/1988  Kinoshita ................. 358/906
5,285,284  2/1994  Takashima et al. ............ 348/731
5,313,282  5/1994  Hayashi ..................... 348/730

Primary Examiner—Thai Q. Tran
Assistant Examiner—Khoi Truong
Attorney, Agent, or Firm—Anderson Kill Olick & Oshinsky

[57] ABSTRACT

A recording apparatus, for use in a video cassette recorder ("VCR") equipped with a timer recording feature is capable of eliminating an interference between a first broadcast signal selected by a VCR tuner and a second broadcast signal captured by a television ("TV") tuner. The apparatus comprises a timer recording control unit for controlling the timer recording and detecting the onset time of the timer recording to thereby generate a detection signal, a control signal generator for generating a control signal in response to the detection signal, and a switch, in response to the control signal, for decoupling a driving power from a modulation circuit and a coupling circuit included in the VCR.

4 Claims, 1 Drawing Sheet

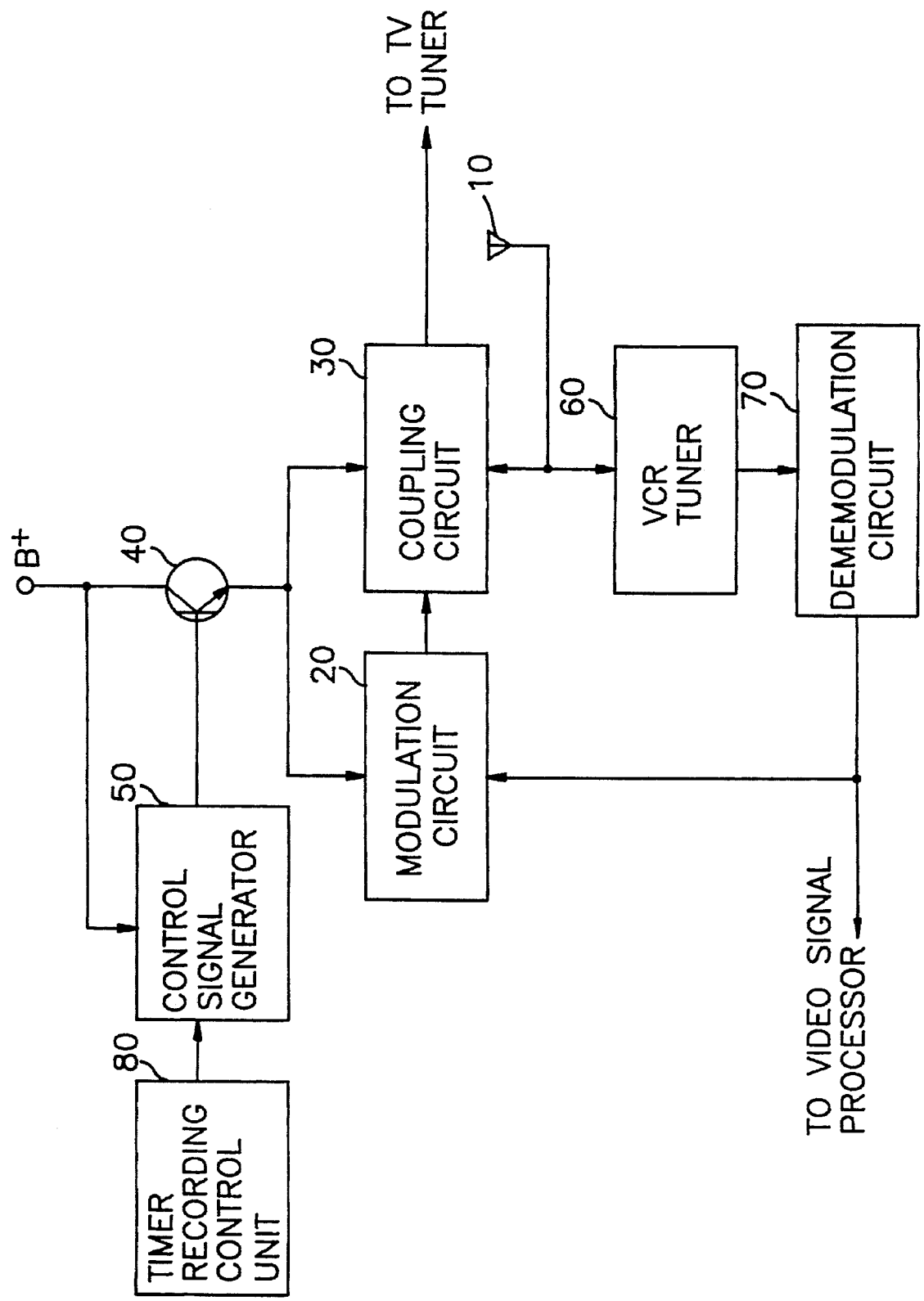

VIDEO CASSETTE RECORDER CAPABLE OF AUTOMATICALLY REMOVING INTERFERENCES BETWEEN A RECORDING SIGNAL AND A BROADCAST SIGNAL

FIELD OF THE INVENTION

The present invention relates to a video cassette recorder; and, more particularly, to a video cassette recorder capable of automatically eliminating an interference between a recording signal and a broadcast signal.

BACKGROUND OF THE INVENTION

When a video cassette recorder ("VCR") provided with a mode conversion switch and a television ("TV") receiver are used together, an external antenna for capturing broadcast signals is conventionally coupled to the TV receiver via the VCR. In such an arrangement, if the mode conversion switch of the VCR is set to a TV mode or the VCR is in the "off" state, the VCR is decoupled from the TV receiver, and a desired TV channel is selected by a TV tuner. On the other hand, if the mode conversion switch is set to a VCR mode by a user or the VCR is turned on(in such an instance, the VCR mode is set automatically), either a playback signal or a broadcast signal selected by a VCR tuner is modulated to a channel 3 or 4 frequency; and the modulated signal is transferred to the TV receiver along with the broadcast signals from the external antenna. The modulated signal from the VCR is normally much stronger than the broadcast signals transmitted through air; causing a strong interference on the relatively weak broadcast signals, rendering it difficult to watch a TV program received through a TV channel directly selected by the TV tuner. Accordingly, when the VCR is in the VCR mode, the TV tuner must be set to a channel 3 or 4 to watch a TV program.

On the other hand, a conventional VCR is equipped with a so-called timer recording feature. By utilizing the timer recording feature, it is possible to program the VCR to carry out an unattended recording of broadcast signals over a desiginated period of time; and the VCR is set to the power "off" state in order to initiate the timer recording.

Therefore, if the VCR is turned on at the onset of recording a broadcast program by the timer recording feature while a viewer is watching a TV program, the VCR is automatically set to the VCR mode, thereby causing an interruption in his watching the TV program.

SUMMARY OF THE INVENTION

It is, therefore, a primary object of the present invention to provide a video cassette recorder capable of automatically eliminating an interference between a broadcast signal selected by a VCR tuner and a broadcast signal captured by a TV tuner during a timer recording of the broadcast signal selected by the VCR tuner.

In accordance with the present invention, there is provided a recording apparatus, for use in a VCR equipped with a timer recording feature, capable of automatically eliminating an interference between a first broadcast signal selected by a VCR tuner and a second broadcast signal captured by a TV tuner, wherein the VCR has means for demodulating the selected first broadcast signal to a composite video signal, modulation means for modulating the composite video signal to a radio frequency video signal, coupling means for coupling the radio frequency video signal to the TV tuner and a power supply for supplying a driving power to the modulation means and the coupling means, said apparatus comprising: means for controlling a timer recording and generating a detection signal at a recording start time of the timer recording; means for generating a control signal in response to the detection signal as long as the VCR is in a turn-on state; switching means, in response to the control signal, for decoupling the driving power from the modulation means and the coupling means, to thereby prevent the radio frequency video signal from being coupled to the TV tuner.

BRIEF DESCRIPTION OF THE DRAWINGS

The above and other objects and features of the present invention will become apparent from the following description the preferred embodiments taken in conjunction with the accompanying drawing, which is a schematic block diagram of a video cassette recorder in accordance with the present invention.

DETAILED DESCRIPTION OF THE PREFERRED EMBODIMENTS

Referring now to the drawing, there is shown a block diagram of a recording apparatus in accordance with the present invention for automatically eliminating an interference between signals selected by a VCR and a TV tuners during the recording of the broadcast program selected by the VCR tuner through the use of a timer recording feature.

As illustrated in the drawing, broadcast signals through an antenna 10 are supplied to the TV receiver via a coupling circuit 30 included in the VCR. The VCR has a mode conversion switch(not shown) for controlling the coupling between the VCR and the TV receiver.

If the mode conversion switch is set to a VCR mode, a driving power B+ from a power supply(not shown) is applied to a switch 40 and a control signal generator 50. In this mode, the control signal generator 50 provides the switch 40 with a turn-on signal for coupling the driving power $B^+$ to a modulation circuit 20 and a coupling circuit 30. In the meantime, a broadcast signal is selected by a VCR tuner 60, and the selected broadcast signal is transmitted to a demodulation circuit 70. The demodulation circuit 70 functions to demodulate the selected broadcast signal by removing a carrier component therefrom to produce a composite video signal. The composite video signal from the demodulation circuit 70 is provided to a video signal processor(not shown) for processing the composite video signal into a form suitable for the recording thereof. Further, the composite video signal is also provided to the modulation circuit 20. The modulation circuit 20 serves to convert the composite video signal into a radio frequency video signal having a channel 3 or channel 4 carrier frequency. The radio frequency video signal from the modulation circuit 20 and the broadcast signals from the antenna 10 are then supplied to the TV tuner via the coupling circuit 30. In such a case, since the radio frequency video signal from the modulation circuit 20 is much stronger than the broadcast signals from the antenna 10, there occurs a strong interference on the broadcast signals from the antenna 10. Accordingly, the TV tuner must be set to channel 3 or 4 for watching desired broadcast program.

On the other hand, if the mode conversion switch is set to a TV mode or the VCR is in the power off state, the driving power $B^+$ is not supplied to the modulation and coupling circuits 20 and 30 and only the broadcast signals from the antenna 10 are fed to the TV tuner, rendering it possible to select a desired TV channel by the TV tuner.

In order to carry out the timer recording, the timer recording information including, e.g., recording start time, recording end time, a TV channel through which the desired broadcast program is to be received, etc., is programmed in a timer recording control unit 80 and the VCR is set to the power off state in order to initiate the timer recording. In such a case, the timer recording control unit 80 continuously checks whether the current time has reached the recording start time. If the current time coincides with the recording start time, the timer recording control unit 80 generates a detection signal and the VCR gets turned on into the VCR mode to start recording the preprogrammed broadcast program, causing the driving power $B^+$ to be supplied to the switch 40 and the control signal generator 50. Then, in accordance with the present invention, the control signal generator 50 continuously provides, in response to the detection signal, a control signal for tuning off the switch 40 as long as the driving power $B^+$ is fed thereto, thereby decoupling the driving power $B^+$ from the modulation circuit 20 and the coupling circuit 30 until the end of the recording.

In accordance with the preferred embodiments of the invention, the switch 40 comprises a npn or a pnp transistor having a base connected to the control signal generator 50. If the npn transistor is employed, a collector is connected to the power supply and an emitter is connected to the modulation circuit 20 and the coupling circuit 30. For the case of the pnp transistor, the collector is coupled to the modulation and the coupling circuits 20 and 30, and the emitter, to the power supply. The switch 40, in response to the control signal, is turned off to thereby decouple the driving power $B^+$ from the modulation circuit 20 and the coupling circuit 30. Then, the modulation and the coupling circuits 20 and 30 are disabled, which is an identical condition as in the TV mode; and, accordingly, the broadcast signals from the antenna 10 are transmitted to the TV tuner through the coupling circuit 30.

Therefore, a viewer can watch a desired TV program without having an interference thereon during the timer recording of a broadcast signal in the VCR.

While the present invention has been described with respect to certain preferred embodiments only, other modifications and variations may be made without departing from the scope of the present invention as set forth in the following claims.

What is claimed is:

1. A recording apparatus, for use in a video cassette recorder equipped with a timer recording feature, capable of automatically eliminating an interference between a first broadcast signal selected by a tuner of the video cassette recorder and a second broadcast signal selected by a television tuner, wherein the video cassette recorder has means for demodulating the selected first broadcast signal to a composite video signal, modulation means for modulating the composite video signal to a radio frequency video signal, coupling means for coupling the radio frequency video signal to the television tuner and a power supply for supplying a driving power to the modulation means and the coupling means, said apparatus comprising:

means for controlling a timer recording and generating a detection signal at a recording start time of the timer recording;

means for generating a control signal in response to the detection signal as long as the video cassette recorder is in a turn-on state; and switching means, in response to the control signal, for decoupling the driving power from the modulation means and the coupling means, thereby preventing the radio frequency video signal from being coupled to the television tuner and allowing a viewer to watch the second broadcast signal selected by the television tuner.

2. The recording apparatus of claim 1, wherein said switching means includes a transistor.

3. The recording apparatus of claim 2, wherein said transistor is a npn transistor.

4. The recording apparatus of claim 2, wherein said transistor is a pnp transistor.

\* \* \* \* \*